Patented Apr. 14, 1953

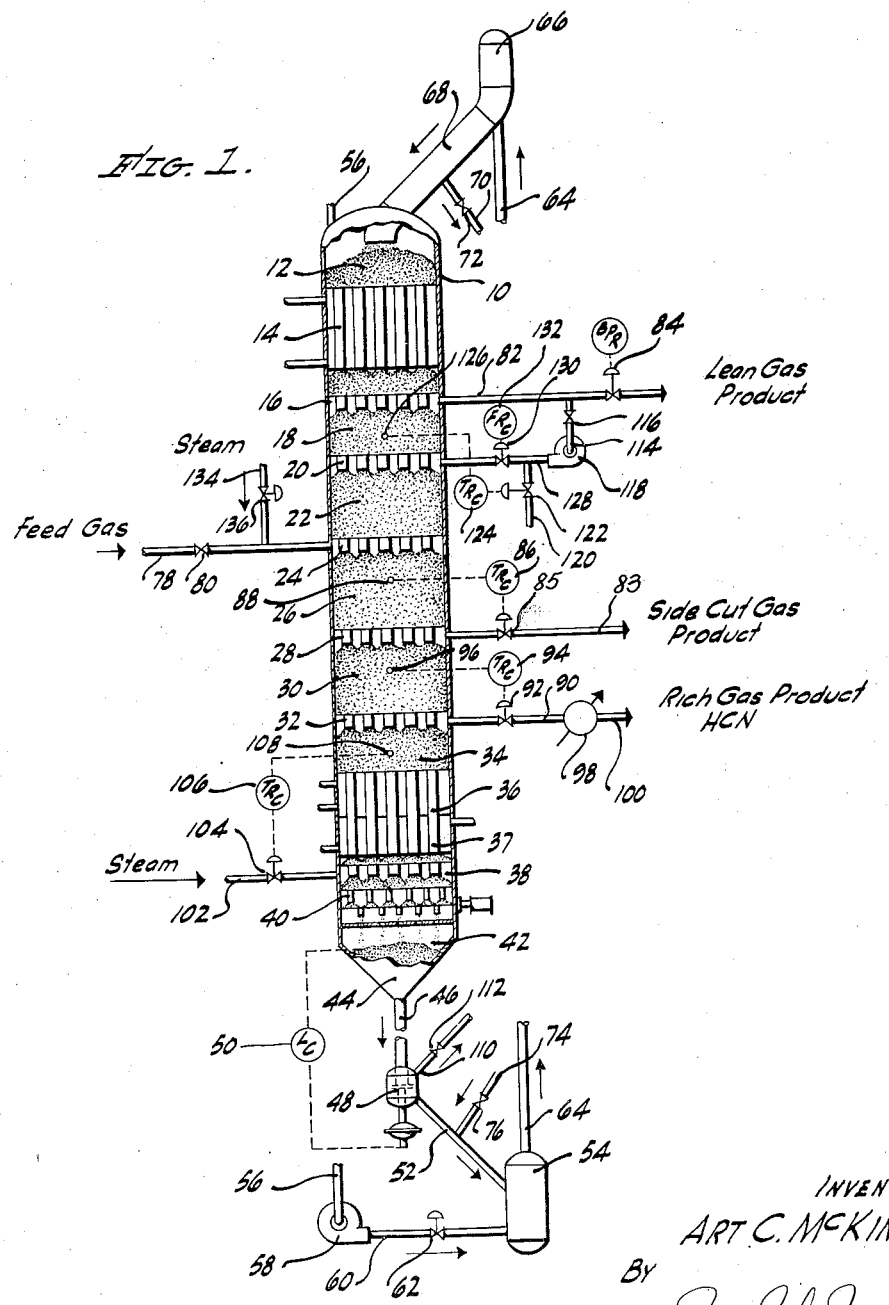

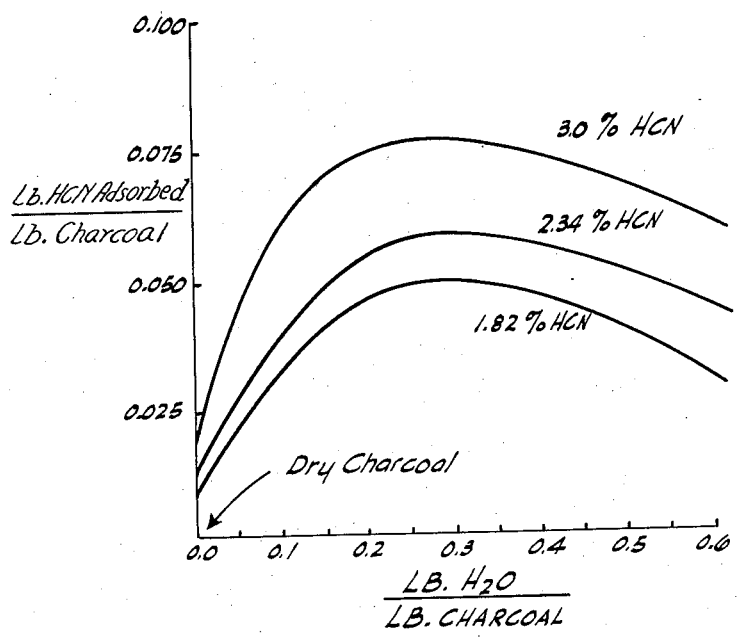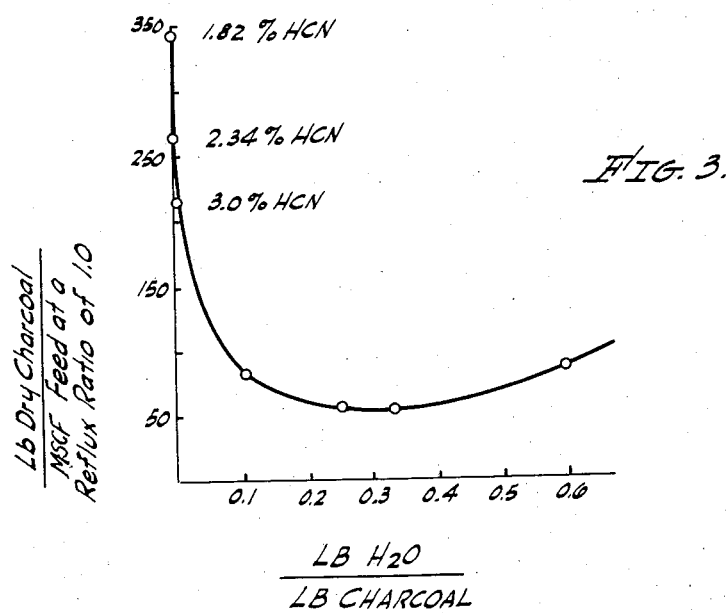

2,634,817

UNITED STATES PATENT OFFICE 2,634,817

METHOD OF SEPARATING HYDROGEN CYANIDE BY ADSORPTION

Art C. McKinnis, Long Beach, Calif., assignor to Union Oil Company of California, Los Angeles, Calif., a corporation of California Application December 11, 1950, Serial No. 200,263

24 Claims. (Cl. 183—4.2)

This invention relates to the separation of gaseous mixtures and in particular to the separation of gaseous mixtures containing hydrogen cyanide by means of a moving bed of solid granular adsorbent.

Gaseous mixtures may be separated conventionally in a variety of well known ways including liquefaction and subsequent distillation of the condensate. However, many times the pressure required for liquefaction is inordinately high and often the temperature required for liquefaction even at such high pressures is quite low. Separation of gaseous mixtures may be also accomplished by absorption in a liquid solvent. However, in many cases expensive solvents are required, solvent losses occur which are especially high when dilute gases are to be separated, the gas product is contaminated with solvent and often high pressures and low temperatures are required.

The use of a solid granular adsorbent as a separating agent provides numerous advantages over the conventional means for gas separation. Among these are reduced operating pressures, more moderate operating temperatures compared with distillation or absorption, the elimination of a liquefaction stage, the elimination of solvent contamination in the product gases and perhaps most important of all is the exceptional efficiency of separation obtainable when treating dilute gases, that is, gas mixtures wherein the component which is to be recovered by adsorption occurs in admixture with other gases to the extent of less than 10% of the mixture.

The characteristics of a solid granular adsorbent which make it suitable for the separation of gaseous mixtures include the property of preferential adsorption which appears as an affinity of the adsorbent for certain constituents of a gaseous mixture in preference to other constituents. Thus certain constituents are preferentially adsorbed by the adsorbent and the degree of adsorption or the preference appears in the hydrocarbon gas series to increase with the molecular weight of the constituent while in the inorganic gases there appears to be a correlation between the preferential adsorbability and the critical temperature of the constituents. Thus the hydrocarbon gases of high molecular weight or the inorganic gases of higher critical temperature are preferentially adsorbed over those constituents having lower molecular weights or critical temperatures. Furthermore, the presence of a less readily adsorbable constituent on the adsorbent does not effect appreciably the preferential adsorption of a more readily adsorbable constituent since the former is preferentially desorbed by the preferential adsorption of the latter. The presence of the more readily adsorbable constituents on the adsorbent will decrease the adsorbability of the less readily adsorbable constituents on that adsorbent.

Applying these principles to the separation of a complex gaseous mixture, a moving bed of solid granular adsorbent is contacted with the gaseous mixture to be separated whereby the more readily adsorbable constituents are preferentially adsorbed along with small quantities of the less readily adsorbable constituents. The rich adsorbent thus formed is subsequently contacted with a reflux gas stream consisting of more readily adsorbable constituents thereby preferentially desorbing the adsorbed less readily adsorbable constituents forming a rectified adsorbent. Subsequently the rectified adsorbent, substantially free of less readily adsorbable constituents and saturated with more readily adsorbable constituents, is treated to effect desorption of the adsorbed materials such as by heating and stripping with a more readily adsorbable stripping gas. A product consisting of the more readily adsorbable constituents of the gaseous mixture is formed leaving a lean adsorbent suitable for contacting further quantities of the gaseous mixture.

It is a primary object of the present invention to provide an improved selective adsorption process for the recovery of hydrogen cyanide contained in gaseous mixtures.

It is a further object of this invention to provide an improved adsorptive process for the recovery of substantially pure hydrogen cyanide by employing an especially treated adsorbent.

Another object of this invention is to provide in an adsorptive process for hydrogen cyanide recovery an especially treated solid granular adsorbent containing a treating agent impregnated thereon which materially assists in the performance of the adsorbent to separate hydrogen cyanide from gas mixtures.

It is a more specific object of the present invention to provide an adsorptive process for hydrogen cyanide recovery in which the hydrogen cyanide adsorption occurs in the presence of a controlled quantity of moisture.

One specific object of the present invention is to pretreat a moving bed of solid granular adsorbent with a controlled quantity of moisture prior to contacting the adsorbent with a gaseous mixture containing hydrogen cyanide.

Another specific object of this invention is to control the quantity of moisture present in the gaseous mixture containing hydrogen cyanide prior to contacting the adsorbent.

It is also an object of the present invention to provide an improved apparatus for the recovery of hydrogen cyanide from gaseous mixtures thereof in which the quantity of moisture present during the adsorption step is controlled within certain critical limits.

Other objects and advantages of this invention will become apparent to those skilled in the art as the description thereof proceeds.

Briefly, the present invention comprises an improved process for the separation of hydrogen cyanide from gaseous mixtures thereof by means of a moving bed of solid granular adsorbent, which process utilizes an unexpectedly discovered adsorption characteristic of water vapor and hydrogen cyanide, and which is contrary to the established principle of preferential adsorption and desorption. It has been found that the adsorbability of hydrogen cyanide (critical temperature 183° C.) is increased markedly by maintaining a controlled quantity of water vapor (critical temperature 374° C.) present during the adsorption of a hydrogen cyanide-bearing gas on a solid granular adsorbent. It has further been found that this improvement in adsorbability is realized by pretreating a lean granular adsorbent with water vapor prior to contacting it with the hydrogen cyanide-bearing gas or by incorporating a controlled quantity of water vapor in the gaseous mixture to be adsorbed.

According to the established relationships correlating adsorbability of gaseous constituents of granular adsorbent, water vapor is more readily adsorbable than hydrogen cyanide and it would normally be expected that its presence would adversely affect the adsorbability of hydrogen cyanide on an adsorbent containing adsorbed water vapor. But contrary to this expectation it has been found that not only is the adsorbability of hydrogen cyanide not adversely affected by the presence of water vapor, the presence of water vapor is strongly beneficial to the adsorbability of hydrogen cyanide on the adsorbent and that in some cases as great an increase as 400% is realized in the adsorbability of hydrogen cyanide on a given weight of adsorbent.

It has further been found that this enhancement of hydrogen cyanide adsorbability is noted only between certain critical limits of moisture concentration and that if the quantity of moisture present is either too high or too low as hereinafter specifically defined the improvement in hydrogen cyanide adsorbability is not realized. Thus by maintaining the quantity of moisture present, either as a vapor in the gas stream or as an adsorbed constituent already on the adsorbent, during the hydrogen cyanide adsorption a maximum may be attained in the weight of hydrogen cyanide adsorbed per unit weight of adsorbent employed. Furthermore, the presence of moisture as a more readily adsorbable constituent minimizes the adsorbability of other gases which may be present in the mixture while enhancing the hydrogen cyanide adsorbability thus further improving the degree of ease of separation.

The process and apparatus of the present invention may be more readily understood and the limits thereof defined by reference to the accompanying drawings in which:

Figure 1 is an elevation view in partial cross section of the selective adsorption apparatus of the present invention in which the improved hydrogen cyanide recovery process is carried out, Figure 2 is a graph showing the beneficial effect upon the adsorbability of hydrogen cyanide due to the presence of water vapor adsorbed on the adsorbent, and Figure 3 shows a second graph which illustrates the beneficial effect in reducing the quantity of adsorbent per unit volume of hydrogen cyanide-bearing gas which is necessary to effect a substantially complete recovery of hydrogen cyanide.

Referring now more particularly to Figure 1, selective adsorption column 10 is provided at successively lower levels therein with hopper zone 12, lean adsorbent cooling zone 14, lean gas product disengaging zone 16, lean adsorbent pretreating zone 18, treating gas engaging zone 20, adsorption zone 22, feed gas engaging zone 24, first rectification zone 26, side cut gas product disengaging zone 28, second rectification zone 30, rich gas product or hydrogen cyanide disengaging zone 32, preferential desorption zone 34, rectified adsorbent heating and stripping zone 36, auxiliary cooling zone 37, stripping gas engaging zone 38, adsorbent feeder zone 40 and bottom zone 42.

The granular adsorbent introduced into hopper zone 12 passes successively through the aforementioned zones as a compact moving bed with a substantially uniform downward velocity throughout the cross sectional area of the column due to the utilization of adsorbent feeder zone 40. The granular adsorbent collects as an accumulation 44 in bottom zone 42 and is removed therefrom via sealing leg 46 at a rate controlled by solids flow control valve 48 in conjunction with level control 50. The granular solids then pass via transfer line 52 into induction zone 54. The conveyance fluid comprising a portion of the substantially unadsorbed gases is removed from hopper zone 12 via line 56 and is introduced thereby into lift gas blower 58 from which it is pressured via line 60 at a rate controlled by valve 62 into induction zone 54. A suspension of granular adsorbent is formed therein which is conveyed via lift line 64 into impactless separator zone 66 wherein the suspension is separated due to the decreased lift gas velocity. The lift gas and granular solids are conveyed via transfer line 68 and are discharged into hopper zone 12 in the top of column 10. By the means just described the granular adsorbent is recirculated through zones of cooling, adsorption, rectification and desorption permitting a continuous separation of hydrogen cyanide from a gaseous mixture.

During this operation a small portion of the recirculating adsorbent withdrawn from transfer line 68 via line 70 at a rate controlled by valve 72 is passed through and indirectly heated to temperatures between 500° F. and 2500° F. in a reactivation zone wherein traces of highly adsorbable and adsorbent deactivating constituents are removed or decomposed forming a reactivated adsorbent. The reactivated adsorbent is subsequently returned to the recirculating adsorbent stream via line 74 controlled by valve 76.

The gaseous mixture containing hydrogen cyanide is introduced into column 10 via line 78 at a rate controlled by valve 80 into feed gas engaging zone 24 and passes upwardly countercurrent to the downwardly flowing adsorbent through adsorption zone 22. Herein the hydrogen cyanide in the gaseous mixture is adsorbed together with small quantities of less readily adsorbable constituents forming a rich adsorbent and leaving a lean gas containing the substantially unadsorbed constituents. This gas passes upwardly and a portion thereof is removed via line 82 at a rate controlled by valve 84 as a lean gas product from the system. The remaining portion passes upwardly through cooling zone 14 as a purge gas countercurrent to the descending adsorbent and joins the recirculating lift gas stream from which an equal amount is continuously removed by means not shown.

The rich adsorbent containing adsorbed hydrogen cyanide flows from adsorption zone 22 through first rectification zone 26 wherein the adsorbent is countercurrently contacted with a reflux flow of gaseous constituents of adsorbability intermediate between hydrogen cyanide and the less readily adsorbable constituents. A preferential desorption of the less readily adsorbable constituents is effected forming a partially rectified adsorbent containing constituents of intermediate adsorbability, hydrogen cyanide and substantially free of less readily adsorbable constituents.

The partially rectified adsorbent subsequently flows into the second rectification zone 30 wherein the adsorbent is countercurrently contacted with a reflux flow of hydrogen cyanide thereby preferentially desorbing the adsorbed constituents of intermediate adsorbability forming a rectified adsorbent. The desorbed intermediate constituents flow upwardly to side cut gas product disengaging zone 28 wherefrom a portion continues upwardly into first rectification zone 26 as a reflux. The remaining portion is removed from disengaging zone 28 via line 83 at a rate controlled by valve 85 in accordance with temperature recorder controller 86 operating in conjunction with temperature sensitive means 88 such as a thermocouple. Thus as excessive quantities of reflux gas enter first rectification zone 26 the adsorbent temperature indicated by means 88 rises and controller 86 acts to open valve 84 thus increasing the proportion of side cut gas product removed and decreasing the proportion introduced into zone 26 as reflux.

The rectified adsorbent containing hydrogen cyanide passes from second rectification zone 30 into preferential desorption zone 34. Herein the rectified adsorbent is contacted countercurrently with a more readily adsorbable stripping gas thereby preferentially desorbing the major proportion of adsorbed hydrogen cyanide from the rectified adsorbent forming a partially stripped adsorbent. The desorbed hydrogen cyanide flows upwardly to disengaging zone 32 from which a portion passes into second rectification zone 30 as deflux and the residual proportion is removed via line 90 at a rate controlled by valve 92 in accordance with temperature recorder controller 94 acting in conjunction with temperature sensitive means 96. The combination of valve 92, controller 94 and means 96 cooperate to control the reflux action in second rectification zone 30 in the exact manner described in connection with a similar combination in the production of the side cut gas product. The desorbed hydrogen cyanide may or may not contain appreciable quantities of the more readily adsorbable stripping gas depending upon the type of stripping operation employed as subsequently described. The gas thus produced, however, is usually warm and is therefore passed through rich gas product cooler 98 and is sent to storage or further processing facilities not shown by means of line 100.

The partially stripped adsorbent passed from zone 34 through heating and desorption zone 36 wherein the heated adsorbent is countercurrently contacted with further quantities of the more readily adsorbable stripping gas mentioned above. At the higher temperatures the residual quantities of adsorbed hydrogen cyanide are desorbed or stripped from the adsorbent and pass upwardly into rich gas disengaging zone 32. A hot lean adsorbent is removed from the bottom of adsorption column 10 and is recirculated to the top thereof to be cooled in cooler 14 and employed to contact further quantities of the gaseous mixture.

Several types of stripping operation may be carried out in desorbing the hydrogen cyanide from the adsorbent.

In one modification of adsorbent stripping a more readily adsorbable stripping gas such as steam is introduced via line 102 at a rate controlled by valve 104 into stripping gas engaging zone 38. The stripping gas passes countercurrent to the downwardly flowing adsorbent successively through zones 36 and 34 and is removed via line 90 with desorbed hydrogen cyanide from disengaging zone 32. The mixture of hydrogen cyanide and steam is subsequentlly cooled or condensed in cooler 98 and may be sent via line 100 to storage or fractionating facilities not shown for the recovery of substantially pure hydrogen cyanide if desired.

In another modification of adsorbent stripping the hydrogen cyanide produced from disengaging zone 32 is substantially free of stripping gas by controlling the stripping temperatures within particular limits. Valve 104 is controlled by temperature recorder controller 106 operating in conjunction with temperature sensitive means 108. The temperature to which the partially stripped adsorbent is heated in zone 36 is maintained at a sufficiently high value as given by the equation below so that a substantially complete desorption of stripping gas from the adsorbent occurs in the lower portions of the heating zone. The thus desorbed stripping gas passes upwardly into preferential desorption zone 34 wherein the temperature is maintained at least 200° F. below the value given in the equation referred to. The stripping gas is preferentially adsorbed on the cooler adsorbent thereby preferentially desorbing the adsorbed hydrogen cyanide as a rich gas product. The adsorbed stripping gas returns to the heating zone with the downwardly flowing adsorbent and is subsequently redesorbed. Thus an internal recycle stripping gas is maintained in the absence of a substantial throughput of stripping gas and the hydrogen cyanide product is substantially free of stripping gas. Temperature sensitive means 108 detects changes in the quantity of the thus recirculating stripping gas and causes valve 104 to open when additional quantities of stripping gas are needed to maintain the internal recycle.

Part of the stripping gas in either modification for adsorbent stripping passes downwardly from engaging zone 38 through sealing leg 46 to solids flow control valve 48. Simultaneously part of the lift gas passes upwardly through transfer line 52 into the solids flow control valve chamber. The combined streams of the two mentioned gases are removed from valve chamber 48 via line 110 controlled by valve 112 as a seal gas stream which prevents lift gas contamination of the rich gas product and the entry of stripping gas into the recirculating lift gas stream.

Either of the two foregoing adsorbent stripping operations for hydrogen cyanide recovery from the adsorbent may be employed with any one of the three following specific operations according to this invention for controlling the quantity of water vapor present during the hydrogen cyanide adsorption.

The essential element of the present invention involves controlling the quantity of water vapor present either in the gas phase of adsorption zone 22 or adsorbed on the adsorbent in the same zone. These two steps are dependent and one or the other may be controlled.

In the first modification of the moisture content control, the cool lean adsorbent discharging from cooling zone 14 is passed through pretreating zone 18 prior to contacting the hydrogen cyanide-bearing gases in adsorption zone 22. In this zone the adsorbent is contacted with a gas containing water vapor to raise the quantity of adsorbed moisture on the adsorbent to within predetermined limits at which adsorbability of hydrogen cyanide is at a maximum. This treating step may be effected by directly injecting into the adsorbent a controlled quantity of steam. Preferably, however, a small quantity of the lean gas product flowing through line 82 is passed by means of line 114 controlled by valve 116 into blower 118. This stream of lean gas forms an adsorbent pretreating recycle stream into which steam is injected via line 120 at a rate controlled by valve 122 in accordance with temperature recorder controller 124 acting in conjunction with temperature sensitive means 126. The moist recycle gas thus formed passes via line 128 at a flow rate controlled by valve 130 and flow recorder controller 132 into pretreating gas engaging zone 20. Since steam is very readily absorbable on the adsorbent its adsorption causes a temperature rise which is maintained by the cooperation of valve 122, controller 124 and temperature sensitive means 126 in an intermediate portion of adsorbent pretreating zone 18. By the steps just described a recirculating stream of lean gas product is passed through the adsorbent prior to its contacting the feed gas mixture and sufficient moisture is introduced to establish on the adsorbent the required moisture content hereinafter described to maintain the maximum hydrogen cyanide adsorbability in the adsorbent.

In a second modification for controlling the moisture content of the hydrogen cyanide adsorption step a predetermined quantity of steam is directly introduced into the feed gas mixture via line 134 at a rate controlled by valve 136. The moisture content of the feed gas is thus raised sufficiently that upon adsorption thereof the quantity of adsorbed moisture is brought within the critical moisture content limits at which hydrogen cyanide adsorbability is greatest.

If desirable a combination of adsorbent pretreatment and of feed gas humidification may be employed.

In a third modification for moisture control the temperature to which the adsorbent is heated in heating zone 36 may be varied in the presence of steam as a stripping gas. By such a control the quantity of adsorbed stripping gas on the adsorbent may be varied between the critical limits of water content so that the lean stripped adsorbent, upon introduction into adsorption zone 22, contains the critical water content.

When activated charcoal is employed as the adsorbent stripping steam may be entirely desorbed from the charcoal by maintaining a maximum temperature in stripping zone 36 which is equal to or greater than the temperature T° F. given by the following equation also referred to above:

$$T° F. = 175\, P^{0.191}$$

wherein P is operation pressure in pounds per square inch absolute.

By operating the stripping zone at maximum temperatures less than those given by the above equation controllable quantities of residual moisture may be left on the adsorbent as lower maximum stripping temperatures are employed. The quantity so remaining is a function of the operating pressure also and is given below:

MOISTURE REMAINING
[Lbs. $H_2O$ ads./lb. charcoal]

| P p. s. i. ab | 10 | 14.7 | 25 | 50 |
|---|---|---|---|---|
| T° F.: | | | | |
| 210 | 0.5 | | | |
| 20 | 0.41 | | | |
| 30 | 0.24 | 0.48 | | |
| 40 | 0.13 | 0.38 | | |
| 50 | 0.07 | 0.25 | | |
| 60 | | 0.13 | 0.50 | |
| 70 | | 0.08 | 0.42 | |
| 80 | | | 0.27 | |
| 90 | | | 0.15 | |
| 300 | | | 0.08 | 0.49 |
| 10 | | | | 0.41 |
| 20 | | | | 0.31 |
| 30 | | | | 0.2 |
| 40 | | | | 0.13 |

In some cases the above temperatures are insufficient to desorb the adsorbed constituents. To effect moisture control a higher temperature is employed for stripping and the stripped adsorbent allowed to cool in auxiliary cooling zone 37 (in Figure 1) to the above listed temperatures in the presence of steam to bring the adsorbed moisture content to the desired value.

Similar relations exist for other adsorbents and these may be determined by well known methods.

If desired, a combination of the third modification of moisture control may be employed with either one or both of the first or second moisture control methods.

Referring now more particularly to Figure 2 graphical data are presented showing the variation in the weight of hydrogen cyanide adsorbed per unit weight of adsorbent (when the adsorbent is activated charcoal) as a function of the weight of moisture employed per unit weight of adsorbent, and with various concentrations of hydrogen cyanide in the feed gas. From the data shown it is seen that the incorporation of adsorbed moisture on the charcoal exerts a markedly beneficial effect upon the adsorbability of hydrogen cyanide on the adsorbene and that by maintaining between about 0.1 and 0.6 pound of moisture per pound of adsorbent the adsorbability of hydrogen cyanide on the adsorbent is at a maximum. Particularly is this true between moisture contents of about 0.2 to 0.45 pound of moisture per pound of charcoal. The maximum adsorbability of hydrogen cyanide apparently occurs at about 0.3 of a pound of water per pound of adsorbent. Preferably therefore the moisture content is maintained in the adsorption zone at about 0.3 of a pound of water vapor per pound of adsorbent and beneficial effects which are substantially as desirable are realized when the moisture content is maintained between about 0.2 and 0.45 pound of water vapor per pound of charcoal.

Referring now more particularly to Figure 3 data are shown which indicate the effect on the required weight of dry charcoal per thousand standard cubic feet (MSCF) of hydrogen cyanide containing feed gas to effect a substantially complete recovery of hydrogen cyanide. As the moisture content in the adsorption step is controlled within the above-mentioned limits and the hydrogen cyanide adsorbability is maintained within its maximum range, the required ratio of pounds of charcoal unit volume of feed gas at a given reflux ratio is brought to a minimum. In Figure 3 the variation in required charcoal rate at a reflux ratio of 1.0 is shown as the moisture content in the adsorption zone is varied throughout the preferred ranges.

For the recovery of hydrogen cyanide in a gas containing 1.82% hydrogen cyanide a charcoal rate of 346 pounds (dry) per MSCF of feed gas is required, whereas only 54 pounds of charcoal containing 0.3 pound of water vapor per pound of charcoal is required per MSCF of feed gas.

In another example of the present invention a gaseous mixture containing 2.34% hydrogen cyanide requires a charcoal rate of 269 pounds per MSCF when dry charcoal is used, but upon employing moist charcoal containing 0.3 pound of adsorbed moisture per pound of charcoal the required adsorbent rate is reduced to only 57.6 pounds per MSCF.

Reflux ratio is the ratio of the quantity of gas returned to a superimposed rectification zone to the quantity of gas withdrawn from the bottom of the same rectification zone.

As a further example a richer feed gas stream containing 3% hydrogen cyanide requires 214 pounds of dry charcoal per MSCF of feed gas and only 55.6 pounds of charcoal containing 0.3 of a pound of moisture per pound of charcoal when the moisture content of the system is controlled.

The foregoing three examples are consistent among themselves in that the separation is made at atmospheric pressure and a reflux of 1.0 is employed, that is the charcoal rate is approximately 200% of that required theoretically to carry all the hydrogen cyanide in the feed gas from the adsorption zone into the desorption zone.

As an example of simultaneous production of a side cut gas product, in the production of hydrogen cyanide by the partial oxidation of ammonia and normally gaseous hydrocarbons hydrogen cyanide is produced along with unreacted hydrocarbon. Hydrogen cyanide is more readily adsorbable than the $C_1$ and $C_2$ hydrocarbons which are in turn more readily adsorbable than the other products of the conversions such as carbon monoxide, nitrogen and hydrogen. Thus nitrogen, carbon monoxide and hydrogen are produced as a lean gas product; methane, ethane, ethylene, acetylene and the hydrocarbon products of conversion of intermediate adsorbability are produced as a side cut gas product; and hydrogen cyanide is produced as a rich gas product.

As further examples, specifically of the humidification of a moisture control in the feed gas as a means for controlling the moisture content of the adsorption step, the following data are given. A gas containing 1.82% HCN should be humidified to 16.4% $H_2O$, one containing 2.34% HCN should be humidified to 17.6% $H_2O$ and one containing 3.0% HCN should be humidified to 17.9% $H_2O$ to establish a moisture content of 0.3 pound per pound of adsorbent at adsorbent rates of about 55–60 pounds per MSCF of feed. With a reflux ratio of 1.0, twice these water vapor contents are needed.

As examples of my process, the following data are given:

*Example I*

One thousand standard cubic feet per hour of HCN bearing gas having 3.0% by volume HCN is contacted with 57 pounds per hour of activated coconut charcoal. The pressure of the adsorption is 14.7 p. s. i. a. A recirculating stream of lean gas product passed through the lean adsorbent introduces water vapor onto the adsorbent at a rate of 17 pounds per hour. The moisture content of the adsorbent is raised to 0.3 pound per pound.

*Example II*

In an operation according to Example I the feed gas is humidified by the addition of 8 pounds per hour of water vapor raising the moisture content to 15.7% while 9 pounds per hour are introduced onto the adsorbent as in Example I.

*Example III*

In a similar separation the lean stripped adsorbent is cooled to a temperature of 250° F. in the presence of stripping steam thereby leaving 0.25 pound of moisture per pound of charcoal. Moisture is introduced at a rate of 2.8 pounds per hour by recirculating humidified lean gas through the lean cool adsorbent.

*Example IV*

By lowering the temperature of the stripper outlet to 245° F. in the operation of Example III, about 0.3 pound of moisture per pound of charcoal remain and no recirculation of humidified lean gas is employed.

*Example V*

In the separation of Example III, 2.8 pounds of moisture per hour are added to the feed gas raising the moisture content to 5.9% instead of adding it to the lean cool charcoal. In either case the moisture content is raised to 0.3 pound per pound of charcoal.

*Example VI*

In separation as given in Example II, 17 pounds of moisture per hour were added to the feed raising moisture content to about 32% to secure desired moisture ratio on the adsorbent.

Desirably, therefore the water vapor present in many HCN-containing gases may be increased to near the dew point of the gas at the temperature that it is introduced into the adsorption column and additional moisture to bring the weight ratio of moisture to adsorbent within the aforementioned preferred limits may be added to the adsorbent directly by either one or a combination of the other two adsorbent treating methods given.

The foregoing data have been disclosed by way of illustrating several of the contemplated modifications of this invention. All of these modifications of moisture content control in the adsorption step and the several modifications disclosed for hydrogen cyanide stripping from the adsorbent may be used alone or in combination with one another without departing from the basic concept of this invention which is the maintenance of the moisture content in an adsorption step between specific limits within which the adsorbability of hydrogen cyanide on adsorbents has been found unexpectedly to rise to a maximum value.

This application is a continuation-in-part of my copending application Serial Number 20,489 filed April 12, 1948, and now U. S. Patent 2,596,421 issued May 13, 1952.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the recovery of hydrogen cyanide from gaseous mixtures which comprises contacting a hydrogen cyanide-bearing gas with a moving stream of solid granular adsorbent in an adsorption zone forming a rich adsorbent containing adsorbed hydrogen cyanide leaving less readily adsorbable gases substantially unadsorbed as a lean gas, introducing and maintaining a moisture content of between 0.1 and 0.6 pound of moisture per pound of adsorbent on said adsorbent and subsequently desorbing hydrogen cyanide as a rich gas product from said adsorbent.

2. A process for separation of hydrogen cyanide from gaseous mixtures which comprises passing a solid granular adsorbent through an adsorption zone and a desorption zone, passing a hydrogen cyanide-containing gas in contact with said adsorbent through said adsorption zone, introducing and maintaining between 0.1 and 0.6 pound of water per pound of adsorbent adsorbed thereon during said contact, subsequently desorbing adsorbed hydrogen cyanide from said adsorbent as a rich gas product in said desorption zone and returning the lean adsorbent thus formed to contact further quantities of said gaseous mixtures.

3. A process according to claim 2 in combination with the steps of indirectly heating said adsorbent and directly contacting the heated adsorbent with a stripping gas to desorb said hydrogen cyanide therefrom.

4. A process according to claim 3 wherein said stripping gas comprises steam, said granular adsorbent comprises activated charcoal, in combination with the steps of maintaining the temperature of said charcoal entering said desorption zone about 200° F. less than T° F. and the maximum temperature of said charcoal within said desorption zone at least T° F. as defined by:

$$T° F. = 175 \, P^{0.191}$$

wherein P is the desorption zone operating pressure in pounds per square inch absolute to establish an internal stripping gas recycle stream within said desorption zone.

5. A process for separating hydrogen cyanide from gaseous mixtures thereof which comprises in combination the steps of recirculating a moving bed of solid granular adsorbent through an adsorbent pretreating zone, an adsorption zone and a desorption zone, passing a humidified gas through said pretreating zone, controlling the humidity of said gas to establish between 0.1 and 0.6 pound of adsorbed water vapor per pound of adsorbent passing therethrough, subsequently contacting the pretreated adsorbent in said adsorption zone with said gaseous mixture to form a hydrogen cyanide-rich adsorbent leaving a lean gas of less readily adsorbable constituents substantially unadsorbed, indirectly heating said rich adsorbent in direct contact with a flow of stripping gas to desorb said hydrogen cyanide as a substantially pure rich gas product leaving a lean adsorbent and returning said lean adsorbent to said pretreating zone.

6. A process according to claim 5 in combination with the steps of recirculating through said pretreating zone a portion of said lean gas and injecting a controlled quantity of a gas containing water vapor into the recirculating stream.

7. A process for separating hydrogen cyanide from gaseous mixtures thereof which comprises recirculating a moving bed of solid granular adsorbent through an adsorption zone and a desorption zone, passing a humidified gaseous mixture containing hydrogen cyanide in countercurrent contact to said adsorbent in said adsorption zone forming a rich adsorbent containing adsorbed water vapor and hydrogen cyanide, controlling the humidity of said gaseous mixture to maintain between 0.1 and 0.6 pound of adsorbed water vapor per pound of dry adsorbent in said adsorption zone, indirectly heating said rich adsorbent in direct contact with a flow of stripping gas to desorb said hydrogen cyanide as a substantially pure rich gas product leaving a lean adsorbent and returning said lean adsorbent to contact further quantities of said humidified gaseous mixture.

8. A process for separating hydrogen cyanide from gaseous mixtures thereof which comprises passing a moving bed of solid granular adsorbent through an adsorption zone and a desorption zone, passing said gaseous mixture countercurrently to the adsorbent flow in said adsorption zone forming a rich adsorbent containing hydrogen cyanide and leaving less readily adsorbable constituents as a substantially unadsorbed lean gas product, passing said rich adsorbent into said sorbed thereon to maintain the adsorbability of desorption zone, indirectly heating said adsorbent therein while directly contacting the heated adsorbent with a flow of stripping steam, removing desorbed hydrogen cyanide as a rich gas product from said desorption zone leaving a hot lean adsorbent, maintaining the lean adsorbent in the presence of said stripping steam to adsorb at least part of the 0.1 to 0.6 pound of water vapor per pound of adsorbent thereon and returning the lean adsorbent to said adsorption zone.

9. A process according to claim 8 wherein said adsorbent comprises activated charcoal and the lean charcoal following hydrogen cyanide desorption is maintained at a temperature below T° F. given by:

$$T° F. = 175 \, P^{0.191}$$

wherein P is the desorption zone pressure in pounds per square inch absolute; to adsorb on said lean charcoal from 0.1 to 0.6 pound of water vapor per pound of charcoal.

10. A process according to claim 9 wherein a maximum stripping temperature above T° F. is employed in said desorption zone in combination with the step of subsequently cooling the hot lean adsorbent to a temperature sufficiently below T° F. in the presence of steam to establish between 0.1 and 0.6 pound of adsorbed water vapor per pound of charcoal on the adsorbent.

11. In a process for the separation of hydrogen cyanide from gaseous mixtures thereof which comprises contacting the gaseous mixture with a solid granular adsorbent and subsequently desorbing adsorbed hydrogen cyanide therefrom, the improvement which comprises introducing and maintaining between 0.1 and 0.6 pound of water vapor per pound of dry adsorbent adhydrogen cyanide at a maximum.

12. In a process for the separation of hydrogen cyanide from gaseous mixtures thereof which comprises contacting the gaseous mixture with a solid granular adsorbent and subsequently desorbing adsorbed hydrogen cyanide therefrom, the improvement which comprises introducing and maintaining between 0.2 and 0.45 pound of water vapor per pound of dry adsorbent adsorbed thereon to maintain the adsorbability of hydrogen cyanide at a maximum.

13. A process for recovery of hydrogen cyanide from gaseous mixtures thereof which comprises passing a moving stream of granular activated charcoal through an adsorption zone, a rectification zone and a desorption zone, passing said gaseous mixture through said adsorption zone, passing activated charcoal countercurrently to said gaseous mixture therein, introducing and maintaining between about 0.2 and 0.45 pound of water vapor per pound of dry charcoal adsorbed thereon in said adsorption zone, contacting the rich charcoal in said rectification zone with a hydrogen cyanide-containing reflux gas thereby preferentially desorbing less readily adsorbable constituents forming a rectified charcoal, heating said rectified charcoal in said desorption zone while directly contacting the heated charcoal with stripping steam forming a lean charcoal and desorbed hydrogen cyanide, employing part of said hydrogen cyanide as reflux in said rectification zone and removing the remaining part as a product stream, cooling said lean charcoal and returning it to contact further quantities of said gaseous mixture in said adsorption zone.

14. A process according to claim 13 wherein at least part of said 0.2 to 0.45 pound of adsorbed water vapor per pound of charcoal is maintained by contacting said cool lean charcoal with a gas containing water vapor prior to contact with said gaseous mixture in said adsorption zone.

15. A process according to claim 13 wherein at least part of said 0.2 to 0.45 pound of adsorbed water vapor per pound of charcoal is maintained by humidifying said gaseous mixture containing hydrogen cyanide followed by contacting the humidified mixture with sufficient granular activated charcoal to adsorb substantially all said hydrogen cyanide and water vapor raising the adsorbed water vapor content of said charcoal to between 0.2 and 0.45 pound per pound of dry charcoal.

16. A process according to claim 13 wherein at least part of said 0.2 to 0.45 pound of adsorbed water vapor per pound of charcoal is maintained thereon by first stripping hydrogen cyanide from the rectified charcoal at a temperature above $T°$ F. given by:

$$T° \text{ F.} = 175 \ P^{0.191}$$

wherein P is the desorption zone pressure in pounds per square inch absolute; subsequently cooling hot lean charcoal in the presence of steam to adsorb between 0.2 and 0.45 pound of adsorbed water vapor per pound of charcoal and returning the lean charcoal to contact further quantities of said gaseous mixture.

17. A process according to claim 14 in combination with the step of humidifying said gaseous mixture.

18. A process according to claim 14 in combination with the step of adsorbing steam on the lean charcoal produced in said desorption zone.

19. A process according to claim 15 in combination with the step of adsorbing steam on the lean charcoal produced in said desorption zone.

20. An apparatus for the recovery of hydrogen cyanide from gaseous mixtures thereof which comprises a vertical adsorption column, means for circulating solid granular adsorbent removed from the bottom of said column to the top thereof for passage downwardly as a moving bed through an adsorbent cooling section, an adsorption section, an adsorbent heating and desorption section, an auxiliary adsorbent cooling section and a steam inlet section, an inlet to said adsorption section for a feed gas, an outlet therefrom for unadsorbed gas, an outlet from said heating and desorption section for desorbed hydrogen cyanide and an inlet for a gas containing water vapor into said steam inlet section, said last named gas passing therefrom through said auxiliary cooling section and said heating and desorption section in direct contact with the granular adsorbent.

21. An apparatus for the recovery of hydrogen cyanide from gaseous mixtures thereof which comprises a vertical adsorption column, means for circulating solid granular adsorbent removed from the bottom of said column to the top thereof for passage downwardly as a moving bed through an adsorbent cooling section, an adsorbent pretreating section, an adsorption section and an adsorbent heating and desorption section, an inlet to said adsorption section for feed gas, an outlet means for removing unadsorbed gas from said adsorption section, means for passing a gas containing water vapor at a controlled rate into and through said adsorbent pretreating section to adsorb water vapor on the adsorbent therein and an outlet from said heating and desorption section for desorbed hydrogen cyanide.

22. An apparatus according to claim 21 wherein the outlet means for unadsorbed gas opens from one extremity of said pretreating section in combination with a recycle conduit opening from said outlet means for unadsorbed gas and into the other extremity of said pretreating section, blower means connected in said recycle conduit to recycle said gas and an inlet opening into said recycle conduit for introducing a controlled amount of water vapor into the recycled unadsorbed gas.

23. An apparatus for the recovery of hydrogen cyanide from gaseous mixtures thereof which comprises a vertical adsorption column, means for circulating solid granular adsorbent removed from the bottom of said column to the top thereof for passage downwardly as a moving bed through an adsorbent cooling section, an adsorption section and an adsorbent heating and desorption section, an inlet to said adsorption section for feed gas, an inlet for a water vapor-containing gas adapted to mix said last named gas with said feed gas, control means connected in said last named inlet means and adapted to control the quantity of water vapor introduced into said feed gas, an outlet for unadsorbed gas from said adsorption section and an outlet for desorbed hydrogen cyanide from said heating and desorption section.

24. An apparatus for recovery of hydrogen cyanide from gaseous mixtures thereof which comprises a vertical adsorption column, means for recirculating solid granular adsorbent removed from the bottom of said column to the top thereof for passage downwardly as a moving bed through an adsorbent cooling section, an adsorbent pretreating section, an adsorption section, a heating and desorption section, an auxiliary cooling section and a steam inlet section, an inlet to said adsorption section for feed gas, an inlet for a water vapor-containing gas adapted to mix a controlled quantity of said last named gas with said feed gas, an outlet for unadsorbed gas from one extremity of said adsorbent pretreating section, recycle conduit and blower means for returning a part of said unadsorbed gas into the other extremity of said pretreating section, means for injecting a controlled amount of water vapor into the recycled portion of said unadsorbed gas, an outlet from said heating and desorption zone for desorbed hydrogen cyanide and an inlet for a gas containing water vapor into said steam inlet section whereby said last named gas so introduced passes therefrom through said auxiliary cooling section and said heating and desorption section in direct contact with the adsorbent therein.

ART C. McKINNIS.

References Cited in the file of this patent

UNITED STATES PATENTS

| Number | Name | Date |
|---|---|---|
| 2,519,344 | Berg | Aug. 22, 1950 |
| 2,519,874 | Berg | Aug. 22, 1950 |